(12) United States Patent
Ko

(10) Patent No.: US 12,085,796 B2
(45) Date of Patent: Sep. 10, 2024

(54) DISPLAY DEVICE

(71) Applicant: LG ELECTRONICS INC., Seoul (KR)

(72) Inventor: Junho Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 174 days.

(21) Appl. No.: 17/761,801

(22) PCT Filed: Feb. 27, 2020

(86) PCT No.: PCT/KR2020/002833
§ 371 (c)(1),
(2) Date: Mar. 18, 2022

(87) PCT Pub. No.: WO2021/054552
PCT Pub. Date: Mar. 25, 2021

(65) Prior Publication Data
US 2022/0390789 A1 Dec. 8, 2022

(30) Foreign Application Priority Data
Sep. 18, 2019 (KR) .................. 10-2019-0114821

(51) Int. Cl.
*G02F 1/1333* (2006.01)

(52) U.S. Cl.
CPC .. *G02F 1/133322* (2021.01); *G02F 1/133314* (2021.01); *G02F 1/133325* (2021.01)

(58) Field of Classification Search
None
See application file for complete search history.

(56) References Cited

U.S. PATENT DOCUMENTS

| | | | |
|---|---|---|---|
| 2008/0088762 | A1 | 4/2008 | Sawada et al. |
| 2015/0181656 | A1* | 6/2015 | Bang .................. G02F 1/133308 313/512 |
| 2016/0120041 | A1 | 4/2016 | Lee et al. |
| 2018/0035560 | A1* | 2/2018 | Kwon .................. H05K 5/0017 |
| 2018/0120633 | A1* | 5/2018 | Yang .................. G02B 6/0088 |

FOREIGN PATENT DOCUMENTS

| | | | |
|---|---|---|---|
| KR | 10-2014-0110472 | | 9/2014 |
| KR | 1020160010822 | | 1/2016 |
| KR | 1020160074771 | | 6/2016 |
| KR | 1020180004464 | | 1/2018 |
| KR | 101950831 | | 2/2019 |
| KR | 102000989 | | 7/2019 |
| KR | 10-2263404 | * | 4/2021 |
| KR | 10-2420996 | * | 11/2022 |

OTHER PUBLICATIONS

PCT International Application No. PCT/KR2020/002833, International Search Report dated Jul. 1, 2020, 2 pages.
European Patent Office Application Serial No. 20866054.8, Search Report dated Aug. 31, 2023, 7 pages.

* cited by examiner

*Primary Examiner* — Ashok Patel
(74) *Attorney, Agent, or Firm* — LEE, HONG, DEGERMAN, KANG & WAIMEY

(57) ABSTRACT

The present disclosure relates to a display device, in more detail, to a display device in which the size of the bezel is reduced while simply improving the assembly of components constituting the display device.

17 Claims, 9 Drawing Sheets

[FIG. 1]
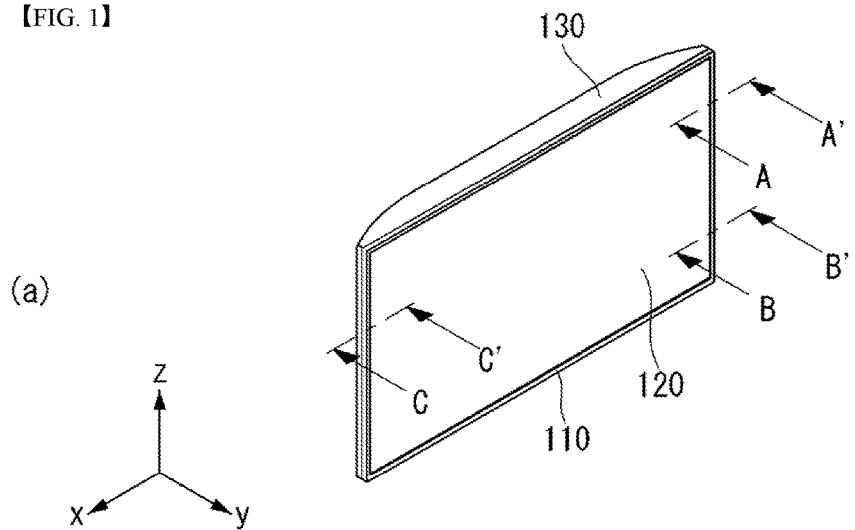
(a)
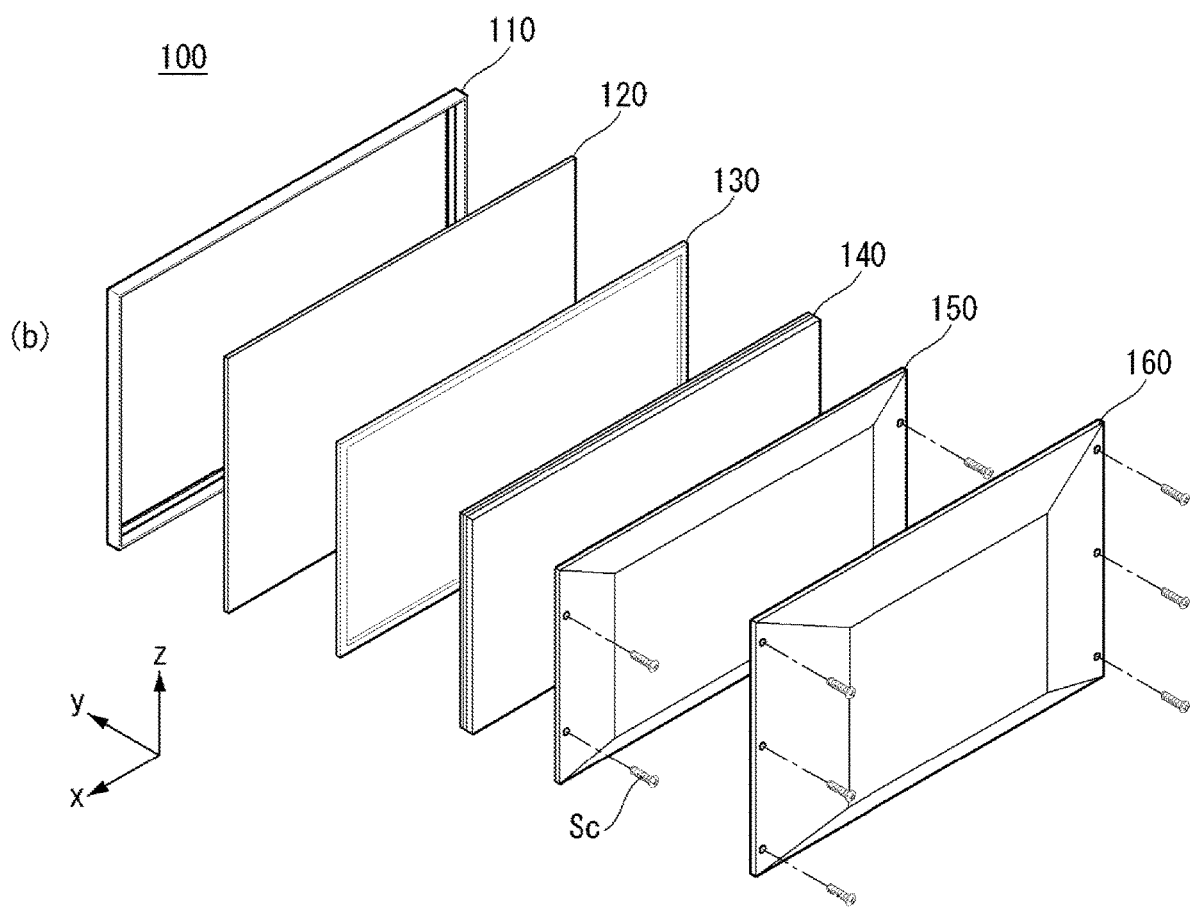
(b)

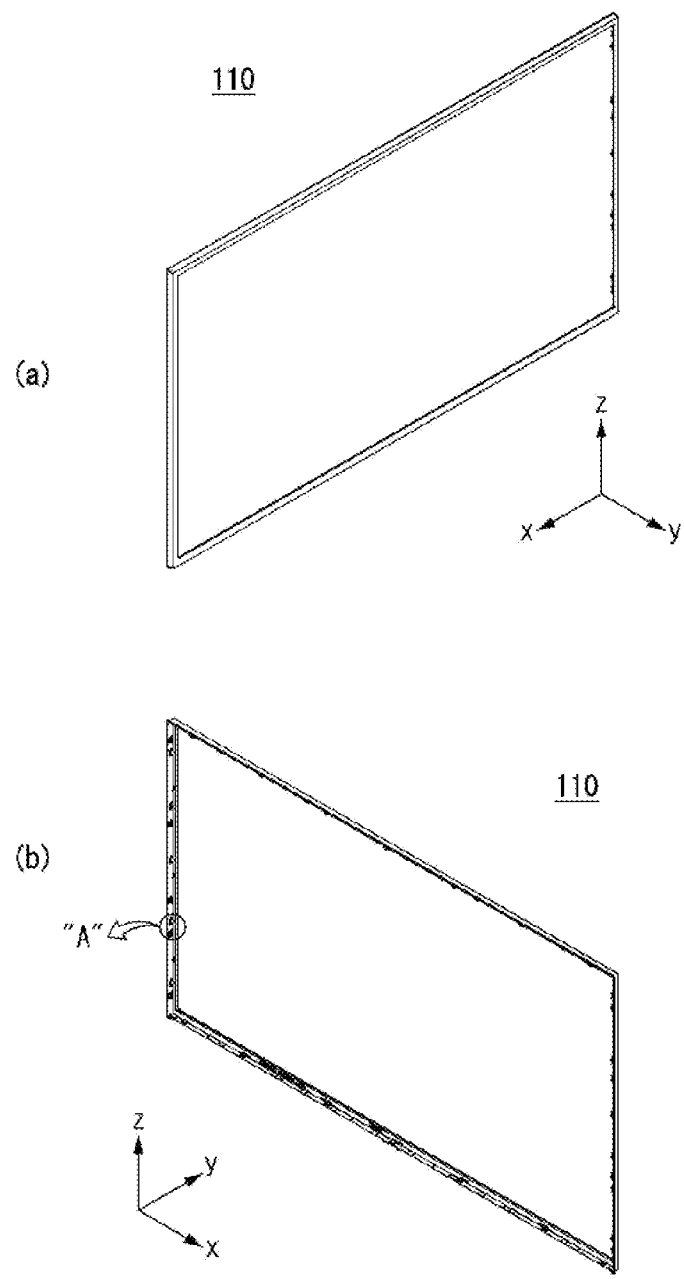
[FIG. 2]

【FIG. 3】
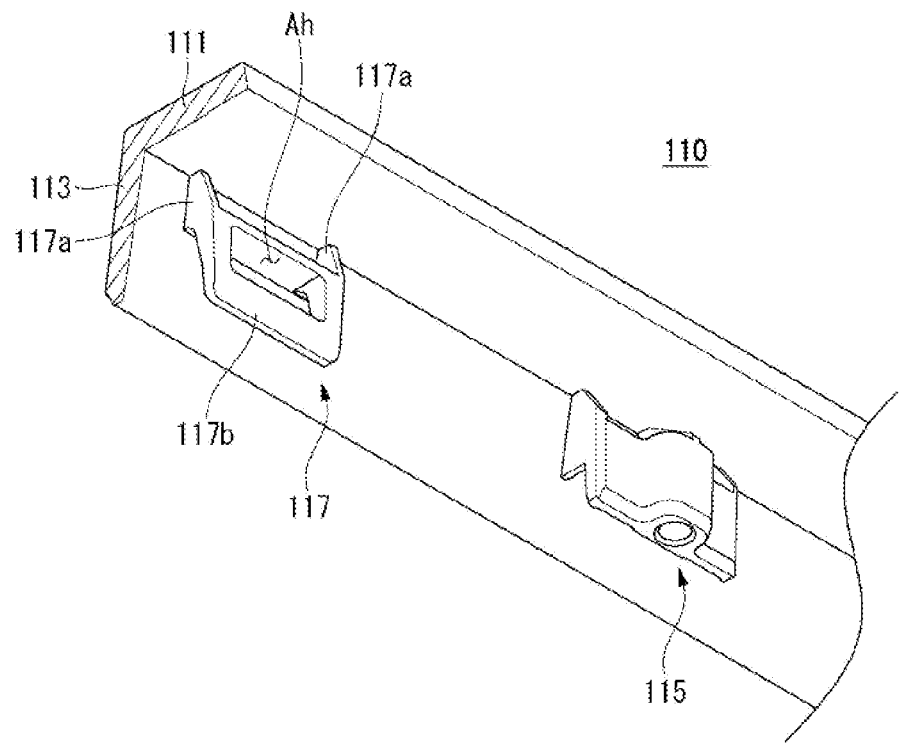
【FIG. 4】
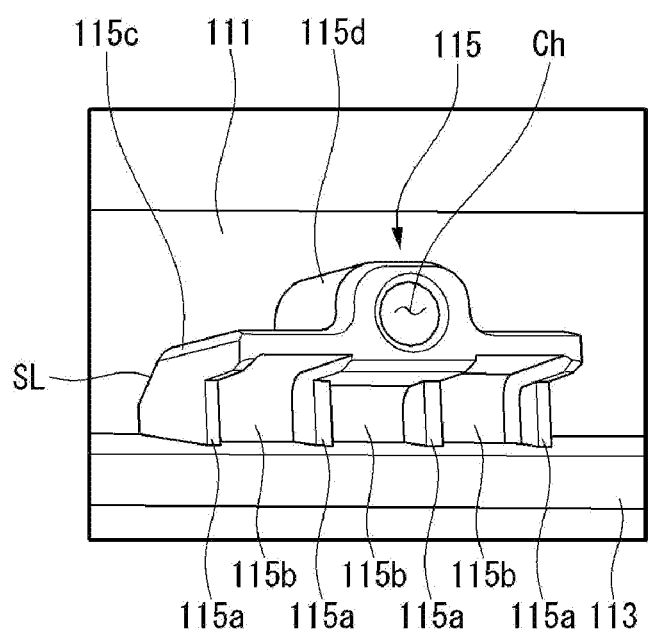

[FIG. 5]
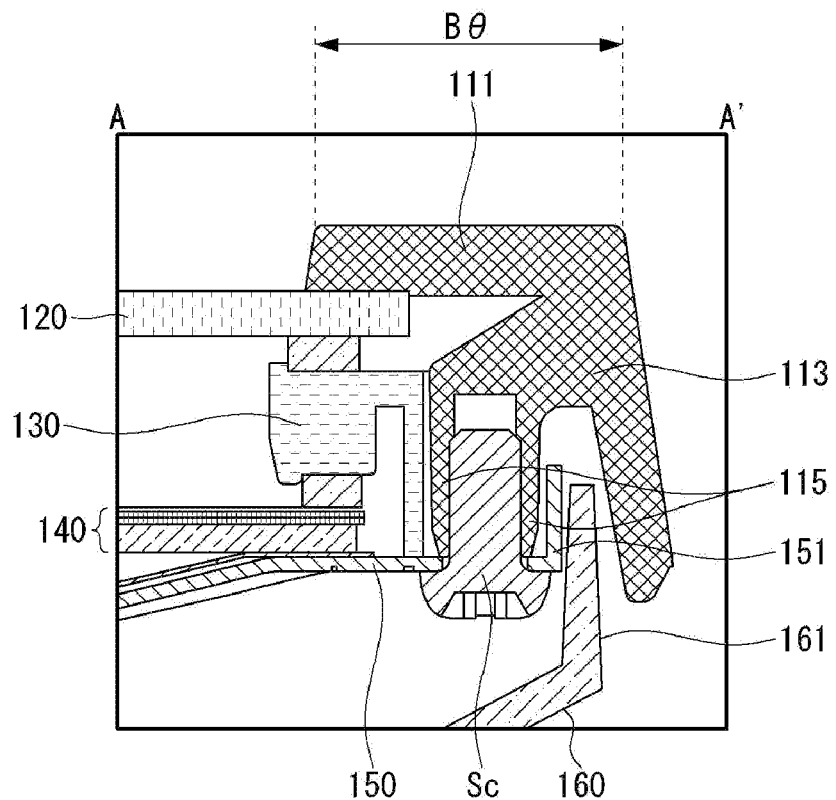
[FIG. 6]
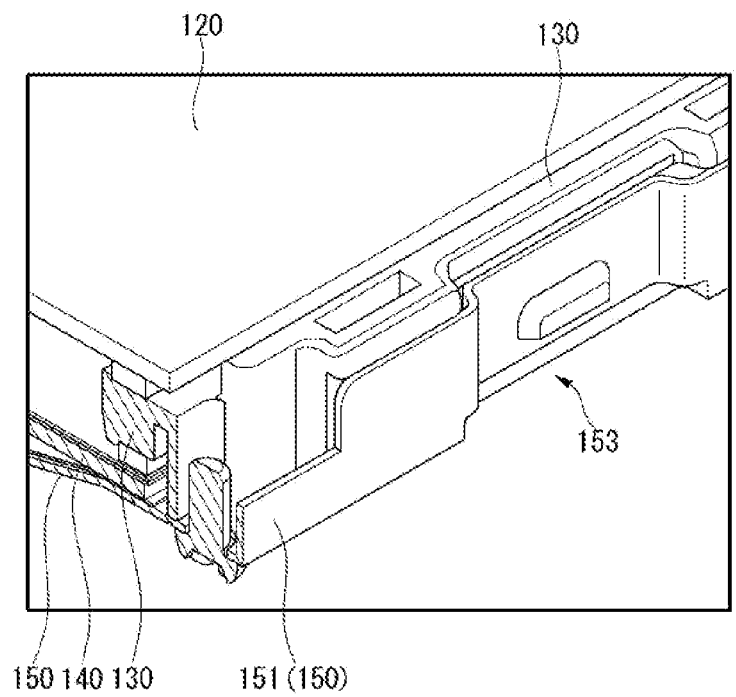

【FIG. 7】
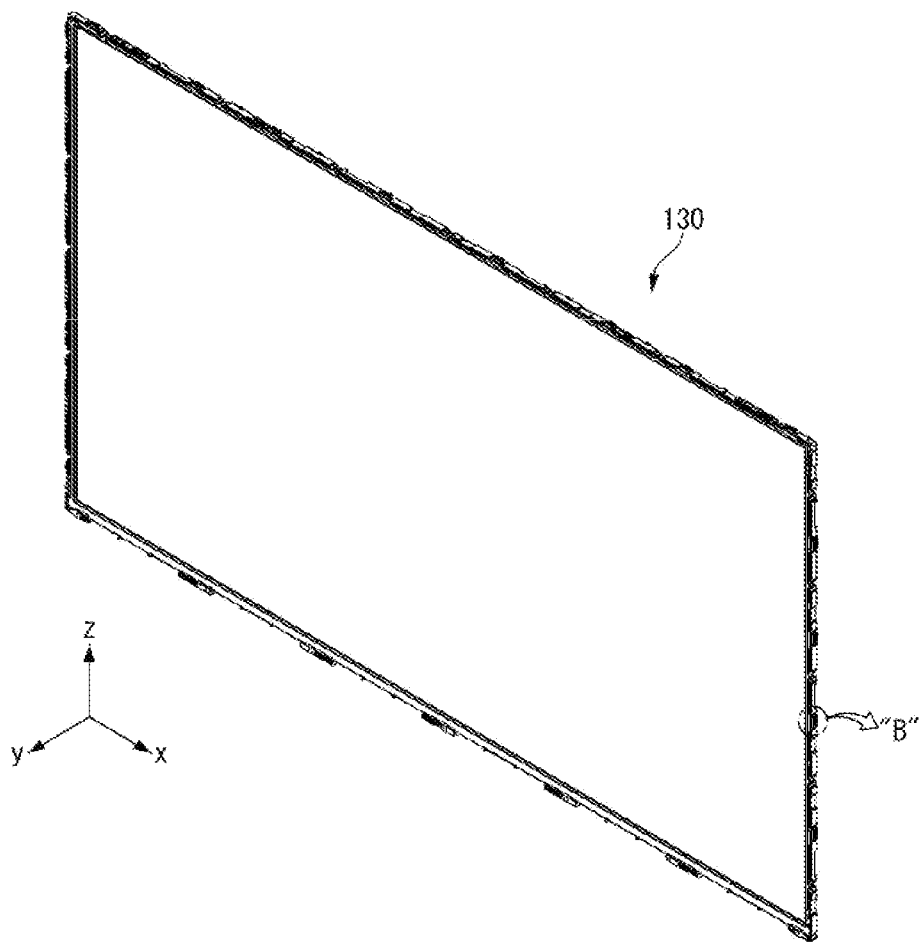
【FIG. 8】
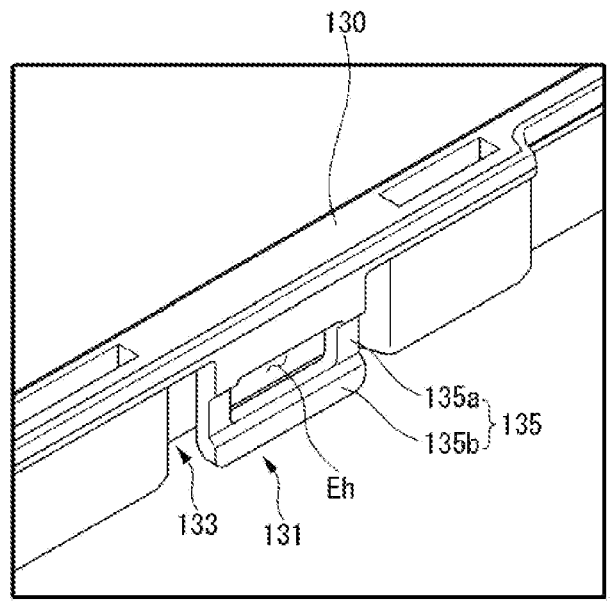

[FIG. 9]
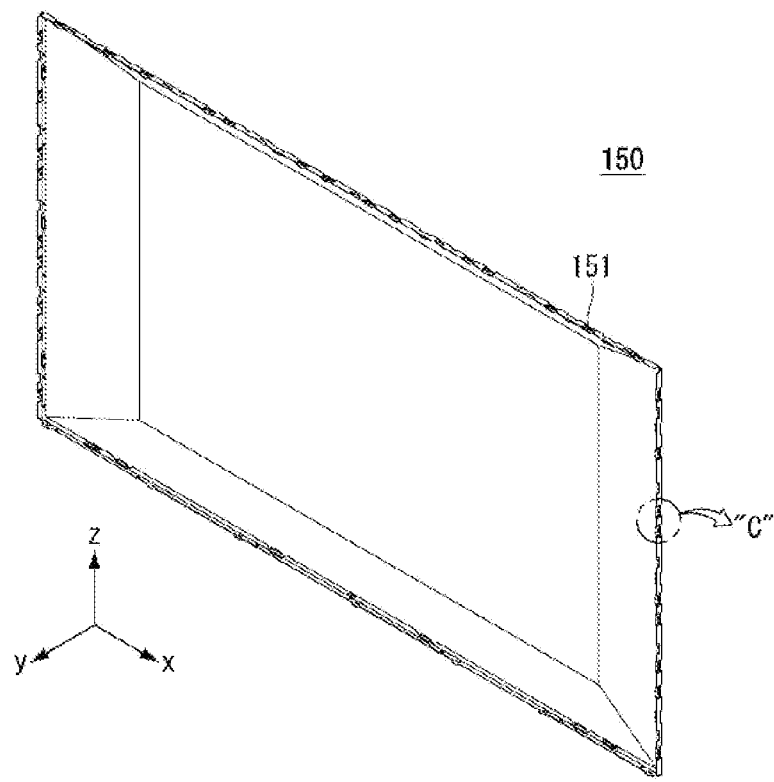
[FIG. 10]
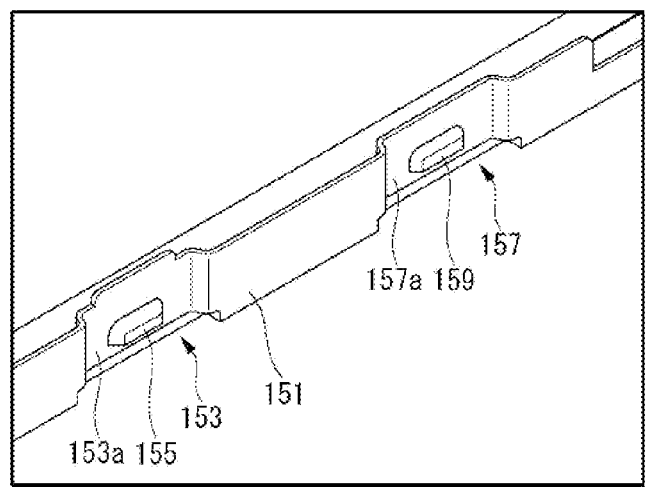

[FIG. 11]
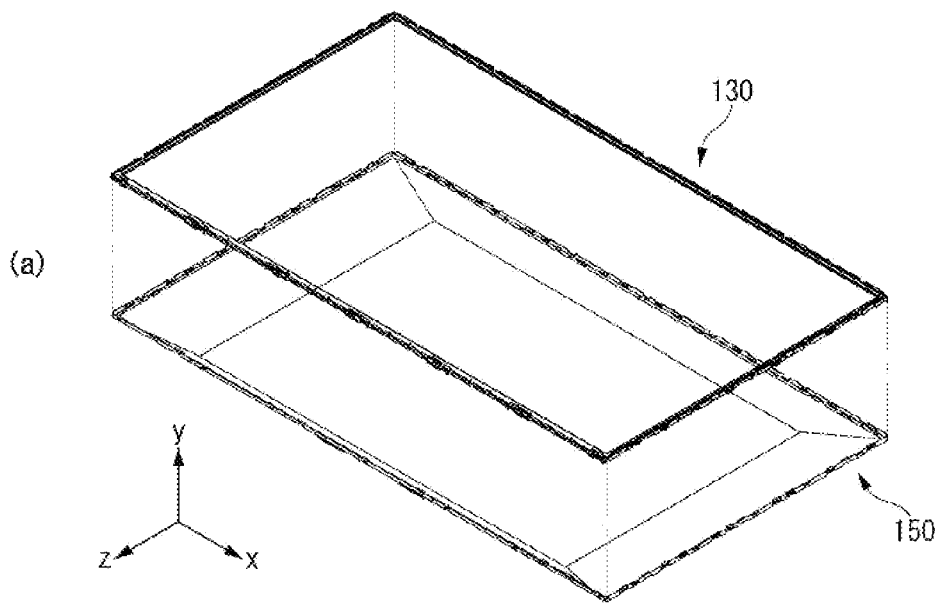
(a)
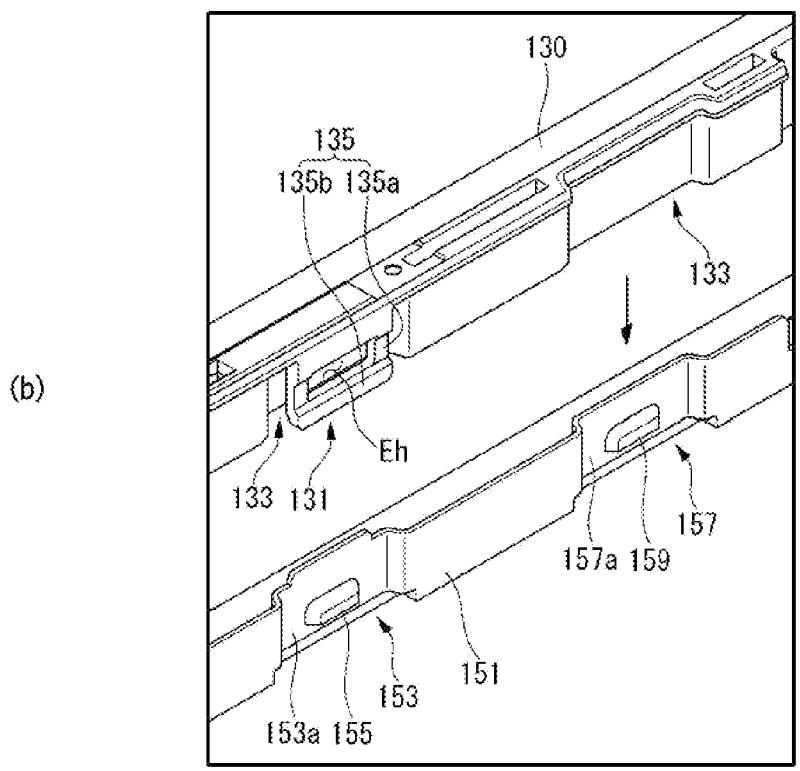
(b)

[FIG. 12]
(a) 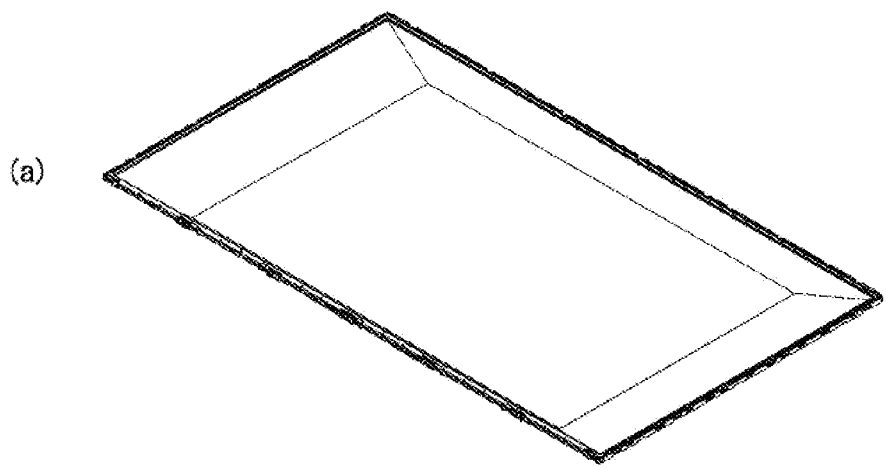
(b) 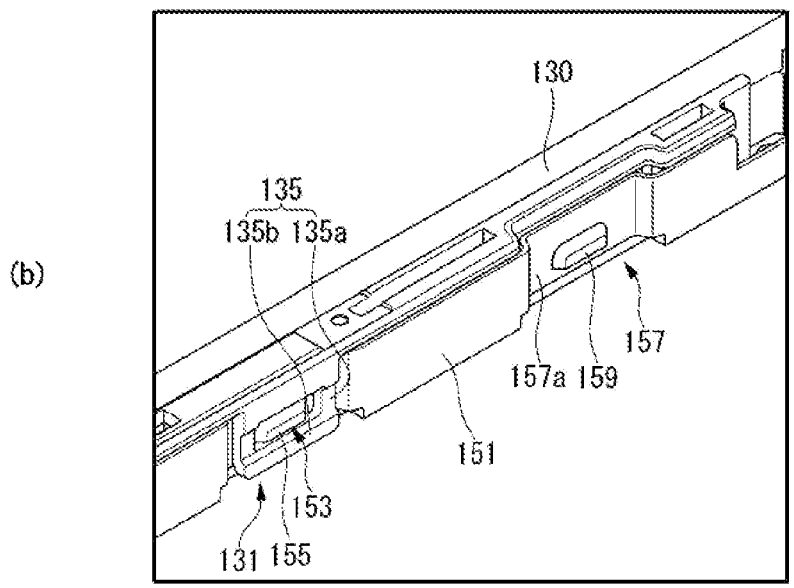

【FIG. 13】
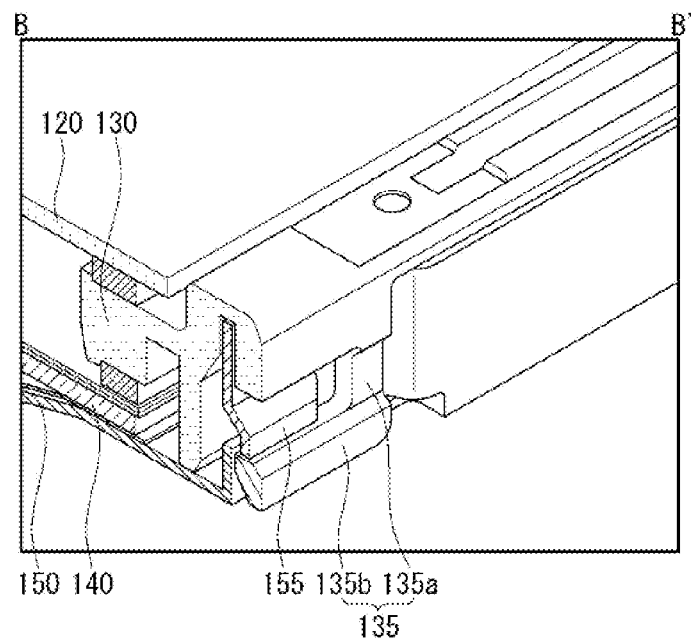
【FIG. 14】
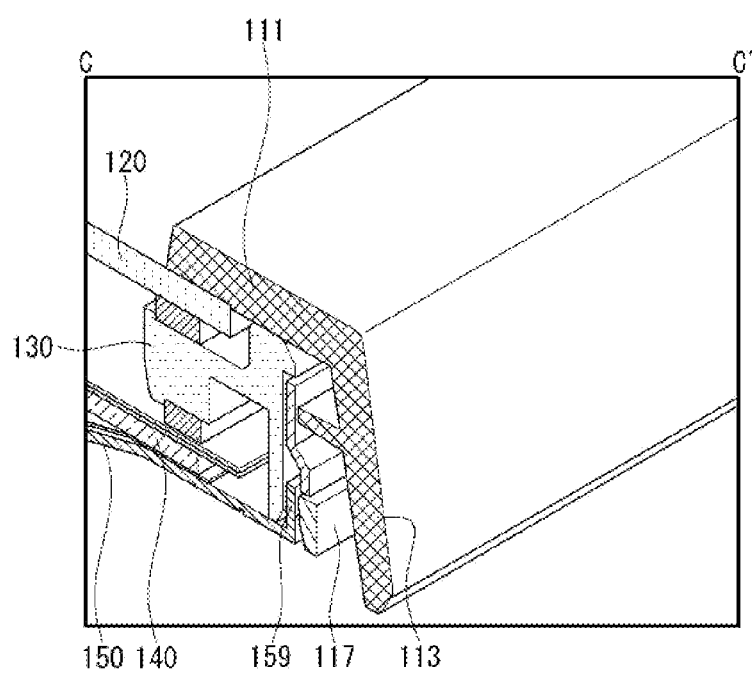

DISPLAY DEVICE

CROSS-REFERENCE TO RELATED APPLICATIONS

This application is the National Stage filing under 35 U.S.C. 371 of International Application No. PCT/KR2020/002833, filed on Feb. 27, 2020, which claims the benefit of earlier filing date and right of priority to Korean Application No. 10-2019-0114821, filed on Sep. 18, 2019, the contents of which are all incorporated by reference herein in their entirety.

TECHNICAL FIELD

The present disclosure relates to a display device, in more detail, to a display device in which the size of the bezel is reduced while simply improving the assembly of components constituting the display device.

BACKGROUND ART

As the information society develops, the demand for display devices is also increasing in various forms, and in response to this, various display devices such as a liquid crystal display device (LCD), a plasma display panel (PDP), an electroluminescent display (ELD), a vacuum fluorescent display (VFD), and an organic light emitting diode (OLED) have been researched and used.

The liquid crystal panel of the LCD may include a liquid crystal layer, a TFT substrate and a color filter substrate facing each other with a liquid crystal layer therebetween, and display an image using light provided from a backlight unit.

The display device including the liquid crystal panel may largely include a case top, a liquid crystal panel, a guide panel, a cover bottom, and a back cover. The case top forms a bezel, which is the edge of the screen, the cover bottom supports the device, the guide panel forms an air gap between the liquid crystal panel and the optical sheet, and the back cover together with the case top forms the exterior of the product.

In general, such parts may be composed of a panel assembly (LCM) by first assembling the case top, the liquid crystal panel, the guide panel, and the cover bottom, excluding the back cover. Then, the display device was assembled by installing a plurality of driving boards, which generate electrical signals necessary to drive the device in the panel assembly, on the rear surface of the panel assembly, placing the back cover over the panel assembly to cover it, and screwing the back cover to the panel assembly.

However, the method of assembling the panel assembly proposed so far has been a method of fixing the guide panel by disposing the guide panel between the case top and the cover bottom while screwing between the case top and the cover bottom.

In this assembly method, the screws were combined from the side rather than the rear side of the device so that the operator could easily assemble the screws, and also to allow screwing between the case top, guide panel and cover bottom. Here, when a direction in which the screen is displayed on the device is referred to as a front, and a direction opposite to the front, that is, toward the back cover, is called a back (or rear), the side refers to a direction that intersects left and right from the front or side.

That is, when constructing the panel assembly, the screws are engaged from the side, whereas since the back cover is screwed to the panel assembly from the rear, when an operator configures the panel assembly, it is inconvenient in operation because it must be done from the rear when screwing from the side but assembling the back cove.

In addition, since the screws are assembled from the side, there is a problem in that the size of the bezel increases to hide the screw connection area.

In addition, since it is a structure in which the screw is exposed to the side, a structure that always covers the screws using the back cover is necessary. Due to this, a design in which the side of the device is thickened is inevitably required.

In addition, since it has a structure in which the ends of the case top and back cover are engaged in the side, there is inevitably a problem with a space between the case top and the back cover in the side.

DETAILED DESCRIPTION OF INVENTION

Technical Problem

The present disclosure aims to solve the above-mentioned problems and other problems.

Another object of the present disclosure is to facilitate assembly of parts.

Another object of the present disclosure is to reduce the size of the bezel.

Technical Solution

According to an aspect of the present disclosure in order to achieve the above objects, the display device comprises a cover bottom in which an optical sheet is disposed in a storage space partitioned by a side wall, a display panel disposed on the optical sheet, a guide panel spaced apart between the display panel and the optical sheet, and positioned inward from the side wall of the cover bottom in a lateral direction to surround a circumference of the display panel, and a case top covering a circumference of a front edge of the display panel and the side wall of the cover bottom, wherein the case top further includes a first coupling portion provided between the side wall of the cover bottom and the guide panel, and wherein the cover bottom is assembled with the case top by a first fastener fastened to the first coupling portion in a front direction.

Preferably, the case top includes a first portion covering the circumference of the edge of the display panel in the front direction, and a second portion covering the side wall of the cover bottom in the lateral direction, and the first coupling portion is formed in the second portion.

Preferably, the first fastener is a screw, and an angle between the first fastener and the first portion of the case top is substantially 90°.

Preferably, the display device of an embodiment further comprises a back cover disposed on a rear surface of the cover bottom and assembled to the cover bottom by a second fastener, wherein a fastening direction of the second fastener is the same as that of the first fastener.

Preferably, the first coupling portion includes a plurality of first ribs arranged in parallel with each other at a predetermined distance apart from each other in the first direction and at least one second rib connecting the first ribs in the first direction.

Preferably, the first ribs are formed to be commonly connected to the first portion and the second portion of the case top.

Preferably, the first coupling portion includes a flange portion connecting ends of the plurality of first ribs in common, and a receiving portion formed to protrude from the flange portion and fastened with the first fastener.

Preferably, the case top is an injection molded product.

Preferably, the display device of an embodiment further comprises a first stopper structure in which the guide panel and the cover bottom are partially engaged.

Preferably, the first stopper structure includes a first bending portion formed on the cover bottom, and formed to be concave inward from the side wall along the lateral direction, and a second coupling portion formed on the guide panel, and fitted and coupled to the bending portion.

Preferably, the second coupling portion includes a groove portion formed to be concave inwardly to correspond to the first bending portion, and a fixing portion formed on the groove portion.

Preferably, the first bending portion includes a first protrusion formed to protrude from the side wall, and the fixing portion includes a first insert in which the protrusion is inserted and coupled to a position corresponding to the first protrusion.

Preferably, the first protrusion is formed by pressing the side wall of the cover bottom, and the first insert is formed in the fixing portion.

Preferably, the display device of an embodiment further comprises a second stopper structure for fixing the case top to the cover bottom.

Preferably, the second stopper structure includes a second bending portion formed on the cover bottom, and formed to be concave inwardly from the side wall along the lateral direction to provide a coupling area, and a third coupling portion formed on the guide panel, and inserted and fastened to the coupling area.

Preferably, the third coupling portion includes a plurality of third ribs arranged in parallel with each other at a predetermined distance from each other in the first direction, and a flange portion for connecting ends of the plurality of third ribs in common.

Preferably, the second bending portion includes a second protrusion formed to protrude from the side wall, and the flange portion includes a second insert in which the second protrusion is inserted and coupled to a position corresponding to the second protrusion.

Preferably, the second protrusion is formed by pressing the side wall of the cover bottom, and the second insert is a hole formed in the flange portion.

Advantageous Effects

The effect of the display device according to the present disclosure will be described as follows.

According to at least one of the embodiments of the present disclosure, the case top is assembled by screws fastened in the same direction as the screw fastening direction for fastening the back cover. Therefore, the operator can easily proceed with the assembly operation.

In addition, according to an embodiment of the present invention, the coupling portion is formed on the case top made of the injection-molded product, but it has high structural stability by including a plurality of ribs. Therefore, it is possible to assemble between the case top and the bottom cover by screwing.

In addition, according to an embodiment of the present invention, the size of the bezel can be effectively reduced through the first stopper structure and the second stopper structure.

Additional scope of applicability of the present disclosure will become apparent from the following detailed description. However, various changes and modifications within the spirit and scope of the present disclosure may be clearly understood by those skilled in the art, and thus, it should be understood that specific embodiments, such as the detailed description and preferred embodiments of the present disclosure, are given only by way of illustration.

DESCRIPTION OF DRAWINGS

FIG. 1 is a diagram showing a schematic configuration of a display device according to embodiments of the present disclosure.

FIG. 2 is a view selectively showing a case top.

FIG. 3 is an enlarged view of a part "A" of FIG. 2(b).

FIG. 4 is a view showing a first coupling portion in another direction.

FIG. 5 is a cross-section taken along line A-A' in FIG. 1.

FIG. 6 is a three-dimensional cross-section of FIG. 5, in which the case top 110 is removed and shown.

FIG. 7 shows an overall view of a guide panel.

FIG. 8 is an enlarged view of a part B of FIG. 7.

FIG. 9 shows an overall view of a cover bottom 150.

FIG. 10 is an enlarged view of a part C of FIG. 9.

FIGS. 11 and 12 illustrate a process in which a guide panel is assembled to a cover bottom.

FIG. 13 is a cross-sectional taken along a line B-B' of FIG. 1, with the back cover removed.

FIG. 14 is a cross-sectional taken along a line C-C' of FIG. 1, and shows a cross-section cut around a second stopper structure.

MODE FOR INVENTION

Hereinafter, embodiments disclosed in the present disclosure are described in detail with reference to the accompanying drawings. The same or similar reference numerals are assigned to the same or similar elements regardless of their reference numerals, and redundant descriptions thereof are omitted.

It is to be noted that the suffixes of elements used in the following description, such as a "module" and a "unit", are assigned or interchangeable with each other by taking into consideration only the ease of writing the present disclosure, but in themselves are not particularly given distinct meanings and roles. Furthermore, in describing the embodiments disclosed in the present disclosure, a detailed description of a related known technology will be omitted if it is deemed to make the gist of the present disclosure vague. Furthermore, the accompanying drawings are merely intended to make easily understood the exemplary embodiments disclosed in the present disclosure, and the technical spirit disclosed in the present disclosure is not restricted by the accompanying drawings and includes all modifications, equivalents, and substitutions which fall within the spirit and technological scope of the present disclosure.

Terms including ordinal numbers, such as the first and the second, may be used to describe various elements, but the elements are not restricted by the terms. The terms are used to only distinguish one element from the other element.

When it is said that one element is "connected" or "coupled" to the other element, it should be understood that one element may be directly connected or coupled" to the other element, but a third element may exist between the two elements. In contrast, when it is said that one element is "directly connected" or "directly coupled" to the other element, it should be understood that a third element does not exist between the two elements.

An expression of the singular number may include an expression of the plural number unless clearly defined otherwise in the context.

It is to be understood that in this application, a term, such as "include" or "have", is intended to designate that a characteristic, number, step, operation, element, part or a combination of them described in the specification is present, and does not exclude the presence or addition possibility of one or more other characteristics, numbers, steps, operations, elements, parts, or combinations of them in advance.

The display panel applicable to the present disclosure may be an organic light emitting diode (OLED), a plasma display panel (PDP), a field emission display panel (FED), and a liquid crystal display (LCD). The following embodiment description describes an example in which the display panel is constituted by the liquid crystal panel.

Hereinafter, a display device according to an embodiment of the present disclosure will be described with reference to the accompanying drawings.

FIG. 1 is a diagram showing a schematic configuration of a display device according to an embodiment of the present disclosure. In FIG. 1 (a) shows an assembled state of the display device, (b) is an exploded view of the display device. In FIG. 1, the screen of the display device is illustrated in a direction toward the y-axis. For reference, in the drawings attached to the present disclosure, the y-axis indicates a direction in which the screen of the display device faces.

The display device 100 of an embodiment includes a case top 110, a display panel 120, a guide panel 130, an optical sheet 140, a cover bottom 150, and a back cover 160.

The case top 110 may be disposed in front of the display panel 120. Here, the front means the direction in which the display device 100 displays the screen, and the +z-axis direction in reference to FIG. 1(a). Hereinafter, the front direction is used to mean the direction in which the screen is displayed.

The case top 110 is configured to surround at least a partial area of the circumference of the front edge and the side surface of the display panel 110. A portion of the case top 110 disposed on the front of the display panel 110 functions as a bezel.

The display panel 110 is provided on the front of the display device 100 to display an image toward the front, and may be positioned at the rear of the case top 110.

In one example, the display panel 110 may be a liquid crystal display panel configured to include a rear substrate disposed to face a front substrate, and a liquid crystal layer disposed therebetween. The front substrate may be configured to include color filters implementing red (R), green (G), and blue (B) sub-pixels. The rear substrate may include switching elements. The rear substrate may switch a pixel electrode. For example, the pixel electrode may change the molecular arrangement of the liquid crystal layer based on a control signal applied from the outside. The liquid crystal layer may include liquid crystal molecules. The liquid crystal molecules may change their arrangement in response to a voltage difference generated between the pixel electrode and the common electrode. The liquid crystal layer may transmit light provided from the backlight to the front substrate or block this. The backlight unit is positioned behind the display panel 110 and supplies light to the front.

The optical sheet 140 is positioned behind the display panel 110 and functions to evenly transmit the backlight to the display panel 110. The optical sheet 140 may be configured to have a plurality of sheets or a layered structure. For example, the optical sheet 125 may include a prism sheet, a diffusion sheet, and a light guide plate.

A part of the guide panel 130 is positioned between the display panel 110 and the optical sheet 140 to form an air gap between the two. In addition, the guide panel 130 is disposed to surround the circumference of the display panel 110 to protect the display panel 110 from impact.

The cover bottom 150 may support components of the display device 100. For example, the cover bottom 150 may support the backlight unit or the optical sheet 140. The cover bottom 150 is made of a metal material such as an aluminum alloy to support the device.

The back cover 160 may be positioned on the back or rear of the display device 100. In one example, the back cover 160 is made of an injection molded product. The back cover 160 is assembled to the cover bottom 150 by a binding member, for example, a screw coupling (Sc), fastened to at least one of the cover bottom 150, the case top 110, and the guide panel 130 in the front direction (it refers to the −z-axis direction based on FIG. 1(b), hereinafter, the direction from the rear to the front is referred to as the front direction).

In an embodiment of the present disclosure, the cover bottom 150 is configured to be coupled to the case top 110 side by binding members, for example, screws, in the front direction.

When the screw coupling is directed in the front direction, it is possible to effectively reduce the size of the bezel that hides the screw coupling area, and since the fastening direction of the screw for fastening the back cover and the fastening direction of the screw for fastening the cover bottom 150 are the same, the operator can fasten the screw in only one direction during the assembly process.

In one embodiment of the present disclosure, a first coupling portion 115 is provided between the case top 110 and the guide panel 130 from the side, so that it can be assembled by screws fastened in the front direction between the cover bottom 150 and the case top 110. In a preferred embodiment, the first coupling portion 115 may be formed on the side of the case top 111.

FIG. 2 is a view selectively showing a case top. In FIG. 2, (a) shows a front view of a case top, and (b) shows a rear view, respectively. FIG. 3 is an enlarged view showing a portion "A" of FIG. 2(b). And, FIG. 4 is a view showing a first coupling portion in another direction, and FIG. 5 is a cross-section taken along line A-A' in FIG. 1, in which the back cover 160 is selectively removed. FIG. 6 is a three-dimensional cross-section of FIG. 5, in which the case top 110 is removed and shown.

Referring to these drawings, the case top 110 is configured to include a first portion 111 and a second portion 113 so as to have a picture frame shape as a whole.

The first portion 111 is positioned at some edge of the front side of the display panel 110 to form a bezel. The second portion 112 is a portion bent by about 90 degrees from the end of the first portion 111 and is positioned on the side surface of the display panel 110 to take charge of the side appearance of the device. Here, the term "side" refers to a side view of the device viewed from the x-axis direction with reference to FIG. 2. Also, in the present disclosure, a direction toward the side from the inside of the device is referred to as a lateral direction.

In one example, the case top 110 may be made of an injection molded product in consideration of the appearance and moldability of the product.

In one embodiment of the present disclosure, the case top 110 is configured to include a first coupling portion 115 and a second coupling portion 117. Here, when the parts constituting the device are assembled, the first coupling portion 115 is provided between the cover bottom 150, more precisely, the side wall of the cover bottom 150 and the guide panel 130 in the lateral direction so that the cover bottom 150 is bound to the binding member, for example, the screw is coupled to the first coupling portion 115 along the front direction from the back side of the device to the front side, so that the cover bottom 150 can be assembled with the case top 110. Considering the fastening direction of the screw, the first coupling portion 115 is preferably formed in the second portion 113 rather than the first portion 111.

Since the case top 110 is made of an injection-molded product in one example, when the screw is bound to the first coupling portion 115 with a strong force, unintentional fastening traces may remain on the surface (outward-facing surface) of the case top 110, and in this case, it may be evaluated as a defect in the device. Therefore, it is preferable that the first coupling portion 115 is formed in the second portion 113 rather than the first portion 111 functioning as the bezel.

The second coupling portion 117 may be formed to be contiguous to the first coupling portion 115 in the y-axis direction of the drawing in one example. The second coupling portion 117 is assembled to the cover bottom 150 when the parts are assembled to fix the case top 110. When the case top 110 is fixed to the cover bottom 110 in this way, it is convenient to work by maintaining the assembled state as it is when changing the position of the device in the up-down, left-right direction during assembly operation, as well as it is possible to increase the fastening force of the case top 110. The second coupling portion 117 will be described in detail later.

In one example, such first and second coupling portions 115 and 117 may be formed in pairs and formed in plurality on the long side and/or the short side, respectively.

For example, the case top 110 has a rough-rectangular shape in which a short side is disposed along the first direction (the y-axis direction of FIG. 2), and the long side is disposed along the second direction (the x-axis direction of FIG. 2). In this case, at least two pairs of the first and second coupling portions 115 and 117 may be disposed on the short side, and at least three or more pairs, more than on the short side, of the first and second coupling portions 115 and 117 may be disposed on the long side.

On the other hand, the first coupling portion 115 may be composed of a plurality of ribs to have sufficient structural rigidity even when injection-molded. The first coupling portion 115 will be described with additional reference to FIG. 4. FIG. 4 is a view selectively showing only the first coupling portion by changing the viewing direction.

The first coupling portion 115 of one embodiment may be configured to include a plurality of first ribs 115a disposed in parallel with each other at a predetermined distance apart from each other in the first direction (y-axis direction of the drawing) and at least one second rib 115b connecting the first ribs 115a in the first direction.

When the case top 110 is injection-molded, in order to prevent a sink mark, the thickness of the rib constituting each rib must have a thin thickness. Therefore, in order to increase structural rigidity, the first ribs 115a are configured in plurality, and the first coupling portion 115 may be configured to include a second rib 115b connecting the first ribs to each of the first ribs. Here, the first ribs 115a may be formed to be commonly connected to the first portion 111 and the second portion 113 to further increase structural rigidity. To this end, the first ribs 115a may be disposed at a corner where the first portion 111 and the second portion 115 meet, in this case, the first rib 115a may be configured to have an inclined surface SL that descends in a direction toward the first portion 111 so that the area joined to the second portion 115 may be larger than an area joined to the first portion 111.

The reason why the area where the first rib 115a is joined to the first portion 111 is smaller than the area where the first rib 115a is joined to the second portion 113 is to prevent the sink mark that may occur during molding. In the case of injection molding, high-heat resin may shrink as it solidifies, and the larger the area, the greater the shrinkage. Therefore, if the area where the first rib 115a is joined to the first portion 111 is smaller than the area where the first rib 115a is joined to the second portion 113, it is possible to reduce the probability of the sink mark occurring in the first portion 111 functioning as a bezel.

The first coupling portion 115 may be configured to further include ends of the plurality of first ribs 115a, more specifically, a flange portion 115c connecting the upper portions of the ribs in common and a receiving portion 115d protruding from the flange portion 115c.

According to this, in one example, the receiving portion 115d to which the screw is coupled may be formed apart from the first portion 111 or the second portion 113 that serves the outer skin of the case top 110. That is, the receiving portion 115d may not be formed to be directly connected to the first portion 111 or the second portion 113. Therefore, even if a large deformation force is applied to the first coupling portion 115 when the screw is fastened to the receiving portion 115d, it does not propagate to the first portion 111 or the second portion 113, so that the screws may be fastened to the receiving portion 115d to prevent the sink mark from occurring in the first and/or second portions 111 and 113 and to have high structural strength. On the other hand, the receiving portion 115d may include a coupling hole (ch) to be fastened with the screw, and a screw thread may be formed on the inner wall surface of the coupling hole.

On the other hand, the first coupling portion 115 configured as described above may be formed to be substantially 90° to the first portion 111 so that the fastening direction of the screw may face the front direction, and more precisely, the coupling hole ch formed in the receiving portion 115d may be formed to be 90° with respect to the first portion 111. Here, the term "90°" is used to mean including an error range of 10%.

The reason for this configuration is so that the binding member fastened to the first coupling portion 115 is completely covered by the case top 110.

As shown in FIGS. 5 and 6, the first coupling portion 115 is formed on the second portion 113 of the case top 110, and the first coupling portion 115 is positioned so that the coupling ball to which the screw Sc is fastened faces the rear direction (opposite to the front side). In addition, the first coupling portion 115 is positioned between the guide panel 130 and a side wall 151 of the cover bottom 150 in the lateral direction. In an embodiment, since the first coupling portion 115 is positioned between the guide panel 130 and the side wall 151 of the cover bottom 150, the bezel area BA can be effectively reduced.

In addition, even if the first coupling portion 115 is formed on the case top 110, since it is spaced apart from the first portion 111 and the second portion 113, even if the screw is fastened to the first coupling portion 115, it may be fastened without damaging the case top 110.

In addition, when the back cover 160 is screwed to the cover bottom 150, a wing portion 161 may be inserted into a coupling area AA provided between the second portion 113 of the case top 110 and the coupling portion 115, more precisely, between the second portion 113 and the side wall 151 of the cover bottom 150. Therefore, it solves a problem that a space between the case top 110 and the back cover 160 is opened from the side and the inside is visible.

On the other hand, as illustrated in FIGS. 5 and 6, the guide panel 130 is disposed along the circumference of the display panel 120 in the lateral direction in one embodiment. Accordingly, if the guide panel 130 is not fixed, the guide panel 130 may flow by a process of handling the device or by an external environment. In this case, the guide panel 130 may hit the display panel 120 or the optical sheet 140 so that a problem may occur.

In one embodiment, the guide panel 130 may be assembled and fixed to the cover bottom 150 through a first stopper structure. The first stopper structure includes a structure in which the guide panel 130 is partially engaged with the cover bottom 150.

In an embodiment, the first stopper structure includes a first bending portion 153 formed on the cover bottom 150 and formed concavely inward along the lateral direction from the side wall 151 and a second coupling portion 131 formed on the guide panel 130 and fitted to the first bending portion 153.

Hereinafter, the first stopper structure will be described with reference to FIGS. 7 to 13. FIG. 7 shows an overall view of a guide panel, FIG. 8 is an enlarged view of part B of FIG. 7, FIG. 9 shows an overall view of the cover bottom 150, FIG. 10 is an enlarged view of part C of FIG. 9, FIGS. 11 and 12 illustrate a process in which the guide panel is assembled to the side wall of the cover bottom, FIG. 11 is a view showing a state before assembly, and FIG. 12 is a view showing a state after assembly. FIG. 13 is a cross-sectional view taken along the line B-B' of FIG. 1, with the back cover removed.

Referring to these drawings, in one example, the guide panel 130 made of an injection-molded product is configured to have a rectangular frame shape as a whole. The shape may be changed based on the shape of the display panel 120. For example, if the display panel 120 has a rectangular shape, the guide panel 130 has a rectangular frame shape. If the display panel 120 is a square shape, the guide panel 130 also has a square rectangular frame shape.

In addition, although an integrally configured guide panel is illustrated in FIG. 7, it may be divided into several pieces as needed.

In one embodiment, the guide panel 130 may be configured to include a plurality of second coupling portions 131 formed on the side surface. For example, when a part along the y-axis direction of the drawing is called a short side and a part along the x-axis direction is called a long axis, a plurality of second coupling portions 131 may be formed on the short side and/or the short side or a long side, or a long side and the short side. The number of the second coupling portions 131 may be adjusted based on the size of the fastening force and the device.

As illustrated in FIG. 9, the second coupling portion 131 according to an embodiment may include a groove portion 133 to be concave inward and formed with a step difference and a fixing portion 135 formed in the groove portion 133.

When the second coupling portion 131 is configured to include the groove portion 133, since the fixing portion 135 does not protrude from the guide panel 130, the thickness of the guide panel 130 is prevented from increasing. Since the thickness of the guide panel does not increase, that is, the size of the bezel area is prevented from increasing correspondingly, a thin bezel can be realized.

The fixing portion 135 is formed to be elastically deformable at the entrance of the groove portion 133. For example, the fixing portion 135 may include a pair of leg portions 135a and a bridge portion 135b which connects the ends of the leg portions and has a stopping protrusion formed therein. The fixing portion 135 is formed to be spaced apart from the wall surface of the groove portion 133 by a predetermined distance so as to be fitted with a bending portion ( ) formed on the cover bottom 150, and the bending portion can be inserted and coupled therebetween. In addition, the fixing portion 135 may be configured to further include a first insert IS therein. The first insert IS may be illustrated as a hole in one example, but may be replaced with a configuration such as a groove to which the protrusion is fastened.

FIG. 9 shows a cover bottom. In FIG. 9, the cover bottom 150 has a box shape in which a receiving space is formed inside as a whole. The cover bottom 150 may be configured to include the side wall 151, and to further include a seating portion ( ) formed with a step difference near the side wall 151. The optical sheet is positioned in the receiving space defined by the seating portion ( ) and the side wall 151.

The cover bottom 150 is configured to further include the first bending portion 153. As illustrated in FIG. 10, the first bending portion 153 may be formed by bending a part of the side wall 151 inward in the lateral direction, and may be configured to have a shape corresponding to the male and female shape of the second coupling portion 131 formed in the above-described guide panel 130, and the arrangement may also be formed to correspond to each of the second coupling portions 131.

A wall surface 153a forming the first bending portion 153 is configured to include a protrusion 155 protruding outward from the lateral direction. Here, the inward direction in the lateral direction refers to an inward direction from the side to the inside of the device, and the outward direction in the lateral direction refers to a direction from the inside of the device toward the side.

In a preferred form, the protrusion 155 may be formed by, for example, press working to protrude a portion of the wall surface 153a.

FIGS. 11 and 12 are views for illustrating a state in which the cover bottom and the guide panel are assembled.

Assuming that the guide panel 130 is assembled to the cover bottom 150 from the top to the bottom, the guide panel 130 is inserted and coupled to the inside of the cover bottom 150. More precisely, the guide panel 130 is inserted into the receiving space created by the side wall 151 and the seating portion ( ) of the cover bottom 150. When the guide panel 130 is assembled to the cover bottom 150, the guide panel 130 is assembled to be surrounded by the side wall 151 of the cover bottom 150.

In the process of assembling, the first bending portion 153 of the cover bottom 150 is inserted into the second coupling portion 131 in which the guide panel 130 is formed, more precisely between the fixing portion 131 and the groove portion 133, and the protrusion 255 formed in the first bending portion 153 is fastened to the coupling hole provided in the fixing portion 131. FIG. 13 shows a cross-sectional view of the second coupling portion 131 and the fixing portion 131 in a state in which the cover bottom and the guide panel are coupled.

As shown, the guide panel 130 may be positioned inside the side wall 151 of the cover bottom 150 in the lateral direction, but the guide panel 130 may be fixed to the cover bottom 150 using the first stopper structure. In this case, the first bending portion 153 of the cover bottom 150 may be bent inward in the lateral direction, and the second coupling portion 130 of the guide panel 130 includes the groove portion 133 formed to be combined with the first bending portion 153, so that both may be coupled without increasing the size of the bezel.

Meanwhile, in one example, the case top 110 may be coupled to the cover bottom through a second stopper structure.

In one embodiment, the second stopper structure includes a second bending portion formed on the cover bottom, and formed concavely inward along the lateral direction from the side wall to provide a coupling area and a third coupling portion formed on the guide panel and inserted and fastened to the coupling area.

Returning to FIG. 10, at least one of the side walls 151 formed along the long side and the short side, respectively, more preferably, long sides and/or short sides facing each other is configured to include a plurality of first bending portions 153 and second bending portions 157.

In one embodiment, the second bending portion 157 formed on the cover bottom 150 may be configured by adopting the first bending portion 153 as it is. In one direction, the second bending portion 157 is formed to be contiguous to the first bending portion 153 and spaced apart from each other by a predetermined distance.

The second bending portion 157 is formed so that the side wall 151 is concave inwardly in the lateral direction in the same manner as the first bending portion 153, and a wall surface 159 is configured to include a press-worked protrusion 159.

In this way, when the first bending portion 153 and the second bending portion 157 are formed identically, the manufacturing cost can be reduced because only one model of the press for press working can be made.

The third coupling portion 117 is formed in the second portion 113 of the case top 110 as illustrated in FIG. 3. The reason for forming the third coupling portion 117 on the second portion 113 is the same as that of the first coupling portion 115.

The third coupling portion 117 is configured to include a plurality of third ribs 117a disposed in parallel with each other at a predetermined distance from each other in the first direction in consideration of structural rigidity, and a flange portion 117b connecting the ends of the plurality of first ribs 117a in common.

Also, the flange portion 117b includes a second insert AH in which the protrusion 159 of the second bending portion 157 is accommodated. In the drawings, an example in which the insert is formed as a hole is described, but it may also be configured as a groove.

FIG. 14 is a cross-section taken along the line C-C' of FIG. 1, and shows a cross-section cut around the second stopper structure.

As shown, a part of the guide panel 130 is positioned between the optical sheet 140 and the display panel 120 to be spaced apart by a predetermined distance between the two. Then, the remaining portion of the guide panel 130 is disposed to surround the circumference of the display panel 120.

In this case, the guide panel 130 may be disposed inside the side wall 151 of the cover bottom 150 in the lateral direction, but the guide panel 130 may be fixedly assembled to the cover bottom 150 through the first stopper structure.

The side wall 151 of the cover bottom 150 includes the second bending portion 157, wherein the bending portion is bent inward in the lateral direction, and the protrusion 159 constituting the second bending portion 157 protrudes outward in the lateral direction.

In addition, the case top 110 has the second portion 113 positioned from the side, and the third coupling portion 117 is disposed inside the second portion 113 at a position corresponding to the second bending portion 157.

Accordingly, the case top 110 is fixed to the cover bottom 150 by the second stopper structure, and also the first coupling portion 115 contiguous to the third coupling portion 117 and formed inside the second portion 113 is assembled to the cover bottom 150 through screw coupling. Accordingly, the case top 110 may be stably assembled.

The embodiments of the present disclosure described above are not mutually exclusive or distinct from each other. In the embodiments of the present disclosure described above, each configuration or function may be used in combination or combined.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a cover bottom having a sidewall and being shaped to define a storage space in which an optical sheet is disposed;
   a display panel disposed on the optical sheet;
   a guide panel spaced apart between the display panel and the optical sheet, and positioned inward from the sidewall of the cover bottom in a lateral direction to surround a circumference of the display panel; and
   a case top covering a circumference of a front edge of the display panel and the sidewall of the cover bottom,
   wherein the case top further includes a first coupling portion provided between the sidewall of the cover bottom and the guide panel,
   wherein the cover bottom is assembled with the case top by a first fastener fastened to the first coupling portion in a front direction,
   wherein the case top further includes a first portion covering the circumference of the front edge of the display panel in the front direction, and a second portion covering the sidewall of the cover bottom in the lateral direction, and
   wherein the first coupling portion is formed in the second portion.

2. The display device of claim 1, wherein the first fastener is a screw, and
   an angle between the first fastener and the first portion of the case top is substantially 90°.

3. The display device of claim 2, further comprising:
a back cover disposed on a rear surface of the cover bottom and assembled to the cover bottom by a second fastener,
wherein a fastening direction of the second fastener is the same as that of the first fastener.

4. The display device of claim 1, wherein the first coupling portion includes
a plurality of first ribs arranged in parallel with each other at a predetermined distance apart from each other in the first direction and
at least one second rib connecting the first ribs in the first direction.

5. The display device of claim 4, wherein the first ribs are formed to be commonly connected to the first portion and the second portion of the case top.

6. The display device of claim 4, wherein the first coupling portion includes a flange portion connecting ends of the plurality of first ribs in common, and
a receiving portion formed to protrude from the flange portion and fastened with the first fastener.

7. The display device of claim 6, wherein the case top is an injection molded product.

8. The display device of claim 1, further comprising:
a first stopper structure in which the guide panel and the cover bottom are partially engaged.

9. The display device of claim 8, wherein the first stopper structure includes
a first bending portion formed on the cover bottom, and formed to be concave inward from the sidewall along the lateral direction, and
a second coupling portion formed on the guide panel, and fitted and coupled to the bending portion.

10. The display device of claim 9, wherein the second coupling portion includes a groove portion formed to be concave inwardly to correspond to the first bending portion, and a fixing portion formed on the groove portion.

11. The display device of claim 10, wherein the first bending portion includes a first protrusion formed to protrude from the sidewall, and
the fixing portion includes a first insert in which the protrusion is inserted and coupled to a position corresponding to the first protrusion.

12. The display device of claim 11, wherein the first protrusion is formed by pressing the sidewall of the cover bottom, and the first insert is a hole formed in the fixing portion.

13. The display device of claim 8, further comprising:
a second stopper structure for fixing the case top to the cover bottom.

14. The display device of claim 13, wherein the second stopper structure includes
a second bending portion formed on the cover bottom, and formed to be concave inwardly from the sidewall along the lateral direction to provide a coupling area, and
a third coupling portion formed on the guide panel, and inserted and fastened to the coupling area.

15. The display device of claim 14, wherein the third coupling portion includes
a plurality of third ribs arranged in parallel with each other at a predetermined distance from each other in the first direction, and
a flange portion for connecting ends of the plurality of third ribs in common.

16. The display device of claim 15, wherein the second bending portion includes a second protrusion formed to protrude from the sidewall, and
the flange portion includes a second insert in which the second protrusion is inserted and coupled to a position corresponding to the second protrusion.

17. The display device of claim 16, wherein the second protrusion is formed by pressing the sidewall of the cover bottom, and the second insert is a hole formed in the flange portion.

* * * * *